(12) United States Patent
Kim (10) Patent No.: US 9,882,358 B2
(45) Date of Patent: Jan. 30, 2018

(54) TRANSPORTATION DEVICE OF WITHDRAWAL CIRCUIT BREAKER

(71) Applicant: LSIS CO., LTD., Anyang-si, Gyeonggi-do (KR)

(72) Inventor: Sungtae Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 15/389,404

(22) Filed: Dec. 22, 2016

(65) Prior Publication Data

US 2017/0194774 A1   Jul. 6, 2017

(30) Foreign Application Priority Data

Dec. 30, 2015   (KR) .......................... 10-2015-0190345

(51) Int. Cl.
| | |
|---|---|
| H02B 11/133 | (2006.01) |
| H02B 11/167 | (2006.01) |
| E05C 9/04 | (2006.01) |
| H02B 11/127 | (2006.01) |

(52) U.S. Cl.
CPC .............. *H02B 11/127* (2013.01); *E05C 9/04* (2013.01); *H02B 11/133* (2013.01); *H02B 11/167* (2013.01)

(58) Field of Classification Search
CPC ..................... H02B 11/133; E05C 9/04–9/048
See application file for complete search history.

(56) References Cited

U.S. PATENT DOCUMENTS

| | | | | | |
|---|---|---|---|---|---|
| 126,404 | A | * | 5/1872 | Lecloux ................. | E05C 9/043 292/36 |
| 768,418 | A | * | 8/1904 | Adams .................... | E05C 9/043 292/36 |
| 3,622,187 | A | * | 11/1971 | Emery .................... | E05C 9/043 292/139 |
| 3,783,209 | A | * | 1/1974 | Cleaveland .......... | H02B 11/133 200/50.25 |

(Continued)

FOREIGN PATENT DOCUMENTS

| | | | |
|---|---|---|---|
| DE | 1006427 A1 * | 8/2001 | |
| DE | 102015013620 A1 * | 4/2017 | ............. E05B 63/14 |

(Continued)

OTHER PUBLICATIONS

European Patent Office Application Serial No. 16198331.7, Search Report dated Apr. 26, 2017, 5 pages.

*Primary Examiner* — Robert J Hoffberg
(74) *Attorney, Agent, or Firm* — Lee, Hong, Degerman, Kang & Waimey PC (57) ABSTRACT

A transportation device of a withdrawal circuit breaker, including a girder assembly mounted on a front surface of a truck and configured to draw-in or draw-out the truck, a body plate formed in a box type having an opened rear side and coupled to the girder assembly, a pair of sliding plates slidably disposed within the body plate, and a rotational plate rotatably disposed between the sliding plates, wherein the transportation device further includes a stopper protruded at one side of the rotational plate and configured to restrict one of the sliding plates and a connection link having one end rotatably coupled to one end of the rotational plate and another end rotatably coupled to another end of one of the sliding plates.

6 Claims, 13 Drawing Sheets

(56) References Cited

U.S. PATENT DOCUMENTS

| | | | | |
|---|---|---|---|---|
| 5,244,238 | A * | 9/1993 | Lindqvist | E05B 65/0841 292/36 |
| 5,280,755 | A * | 1/1994 | Batur | E05B 65/0075 109/50 |
| 5,437,484 | A * | 8/1995 | Yamada | E05B 35/008 292/336.3 |
| 5,791,700 | A * | 8/1998 | Biro | E05C 9/043 292/36 |
| 6,689,968 | B2 * | 2/2004 | Trivette | H01H 33/666 200/50.21 |
| 6,884,949 | B2 * | 4/2005 | Yoon | H02B 11/133 200/50.26 |
| 8,294,051 | B2 * | 10/2012 | Park | H02B 11/133 200/50.21 |
| 9,607,784 | B2 * | 3/2017 | Benke | H01H 9/24 |
| 2016/0156164 | A1 * | 6/2016 | Yang | H01H 33/46 200/50.24 |
| 2016/0164267 | A1 * | 6/2016 | Kim, II | H01H 71/0207 200/50.23 |
| 2017/0155234 | A1 * | 6/2017 | Benke | H02B 11/133 |

FOREIGN PATENT DOCUMENTS

| | | | | |
|---|---|---|---|---|
| EP | 0109544 | B1 * | 5/1989 | H02B 11/133 |
| EP | 2267852 | | 12/2010 | |
| EP | 2228877 | | 10/2013 | |
| JP | 56133216 | | 10/1981 | |
| JP | H09168210 | | 6/1997 | |
| JP | 2000341812 | | 12/2000 | |
| JP | 2005160280 | | 6/2005 | |
| JP | 2008131818 | | 6/2008 | |
| KR | 100386630 | | 6/2003 | |
| KR | 20040092599 | | 11/2004 | |
| KR | 100505052 | | 8/2005 | |
| KR | 20100125812 | | 12/2010 | |
| KR | 1020100138640 | | 12/2010 | |
| NL | WO 2004099537 | A1 * | 11/2004 | E05B 47/0688 |

* cited by examiner

Fig. 1

Prior Art

Fig 2

Prior Art

Fig 3

Prior Art

Fig 4

Prior Art

Fig 5

Prior Art

Fig 6

Prior Art

Fig 7a

Prior Art

Fig 7b

Prior Art

Fig 8

Prior Art

Fig 9a

Prior Art

Fig 9b

Prior Art

Fig 13

TRANSPORTATION DEVICE OF WITHDRAWAL CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2015-0190345, filed on Dec. 30, 2015, the contents of which are all hereby incorporated by reference herein in its entirety.

BACKGROUND OF THE INVENTION

1. Field of the Invention

The present invention relates to a transportation device of a withdrawal circuit breaker, more particularly, to a withdrawal circuit breaker capable of preventing an incomplete separation of a main body of the circuit breaker and securing safety of a user by causing the left and right handle assemblies to be simultaneously operated when withdrawing the main body of the circuit breaker.

2. Description of the Conventional Art

In general, a circuit breaker is mounted on a distribution board which is provided for operation or control of power plants or substations, or for operation of motors, together with other electric appliances, and is used, in general, in a state that it is contained in a distribution box or a cradle fixed to the distribution board.

Within the distribution board, a base line of the circuit breaker and a load terminal are connected to a base line of a cradle and a load terminal to form a service position where voltage and current are provided and a test position where the base line of the circuit breaker and a load terminal are separated from the terminal of the cradle so that only a test of an operation of the circuit breaker may be available.

Here, an operation to put a circuit breaker in the distribution board to connect to the terminals of a cradle is called "draw in", and an operation to put the circuit breaker out of the distribution board to separate the circuit breaker from the terminals of the cradle is called "draw out". Further, the circuit breaker includes a control power plug which is configured to transmit an electric signal to the circuit breaker to turn on or turn off the circuit breaker at the service and test positions.

Figure 1:
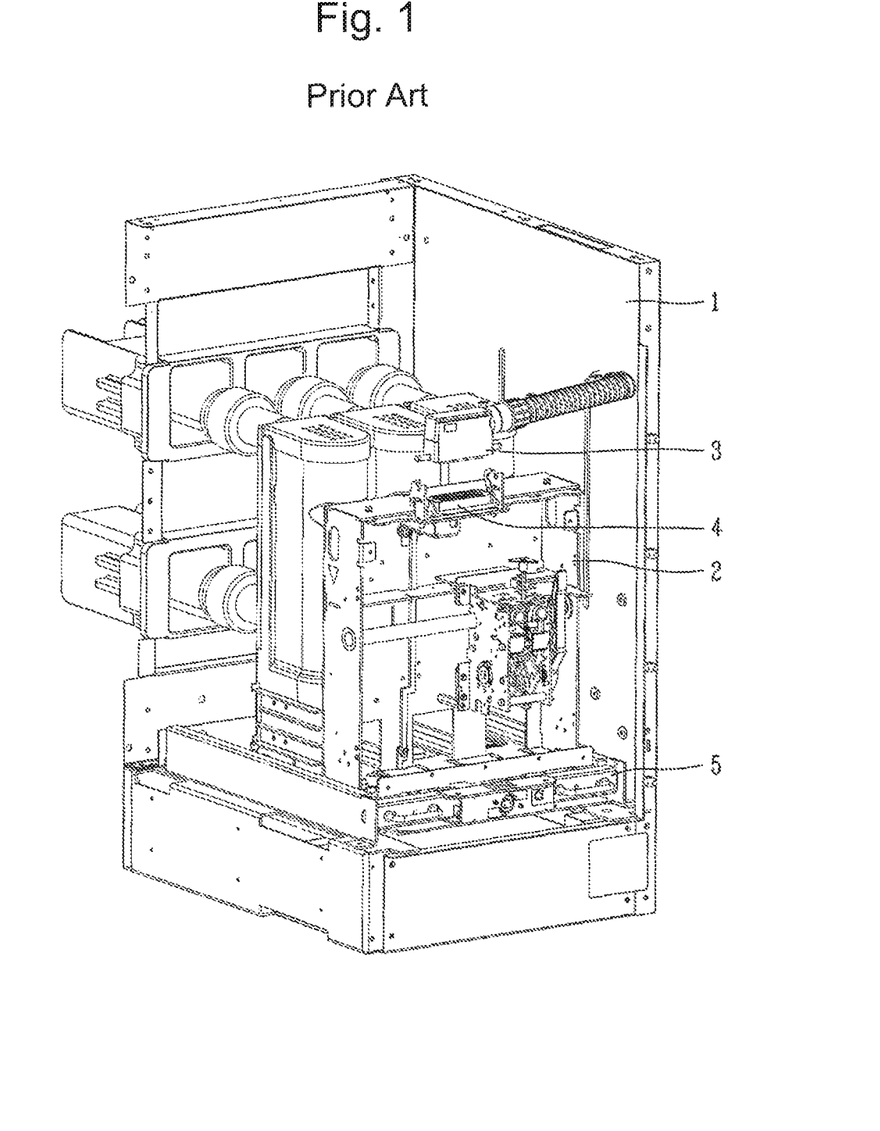
FIG. 1 is a perspective view illustrating that a main body is accommodated within a distribution box in a test position in a state that a control power plug is not connected.
Figure 2:
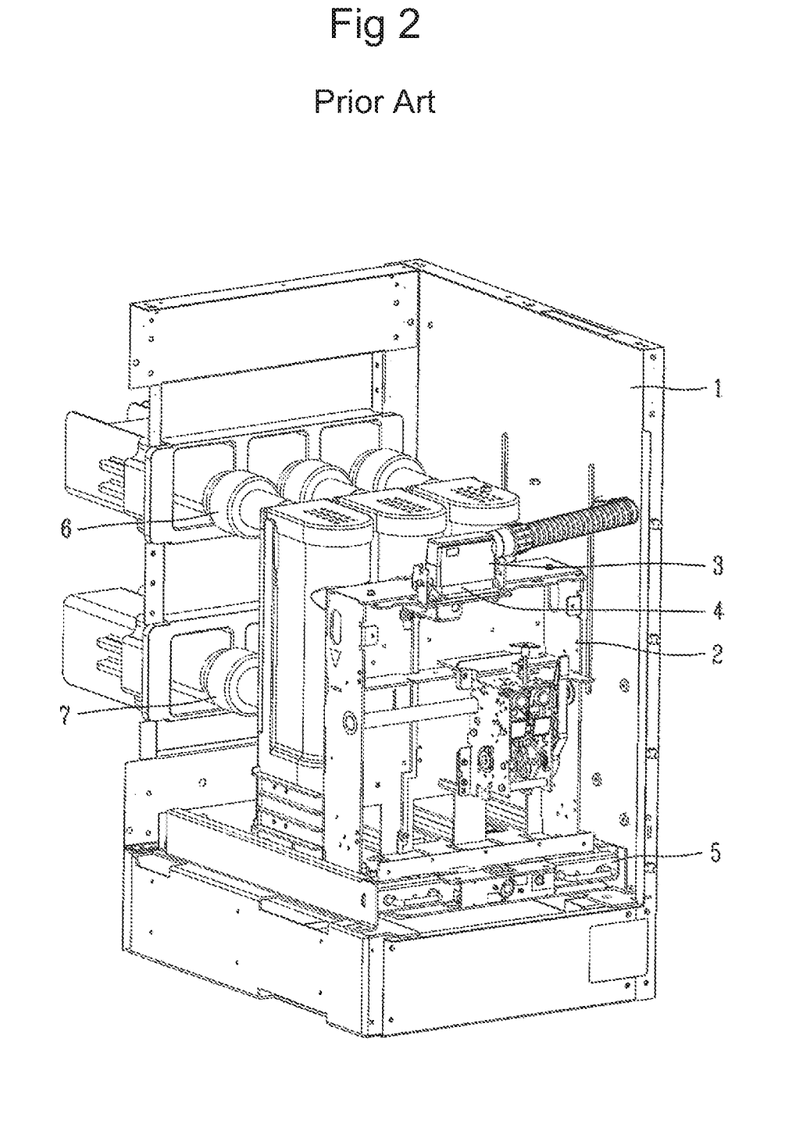
FIG. 2 is a perspective view illustrating a state that the control power plug is connected in FIG. 1.
Figure 3:
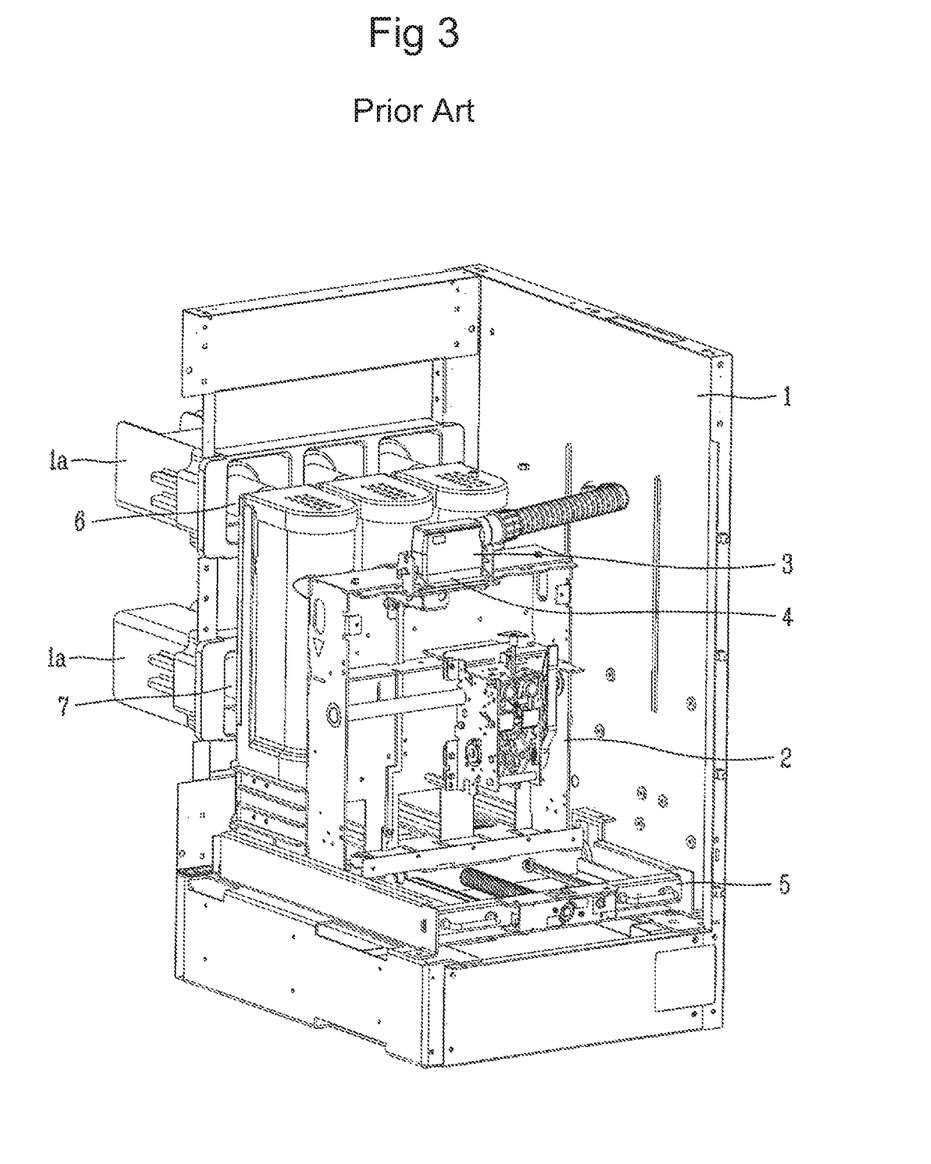
FIG. 3 is perspective a view illustrating a state that the main body is in a service position.

FIGS. 1 through 3 are views illustrating a main body of a circuit breaker in accordance with a conventional art accommodated within a distribution box (cradle). Here, FIG. 1 shows that the main body is in a test position in a state that a control power plug is not connected, FIG. 2 shows a state that the control power plug is connected, and FIG. 3 shows that the main body is in a service position. Here, the main body 2 is shown in a state that a front cover is removed.

The main body 2 is movably disposed within the distribution box 1. The test position is a position before the main body 2 is moved toward the distribution box 1. The main body 2 is moved to a service position after connecting a control power plug 3 with a control power connector 4 which are provided on an upper portion of the main body 2. Movement of the main body 2 is carried out by a transportation device 5 disposed at a lower part of the main body 2, and when the base terminal 6 and load terminal 7 of the main body 2 are connected with a terminal 1a disposed within the distribution board 1, movement of the main body 2 to a service position is completed, as shown in FIG. 3.

Figure 4:
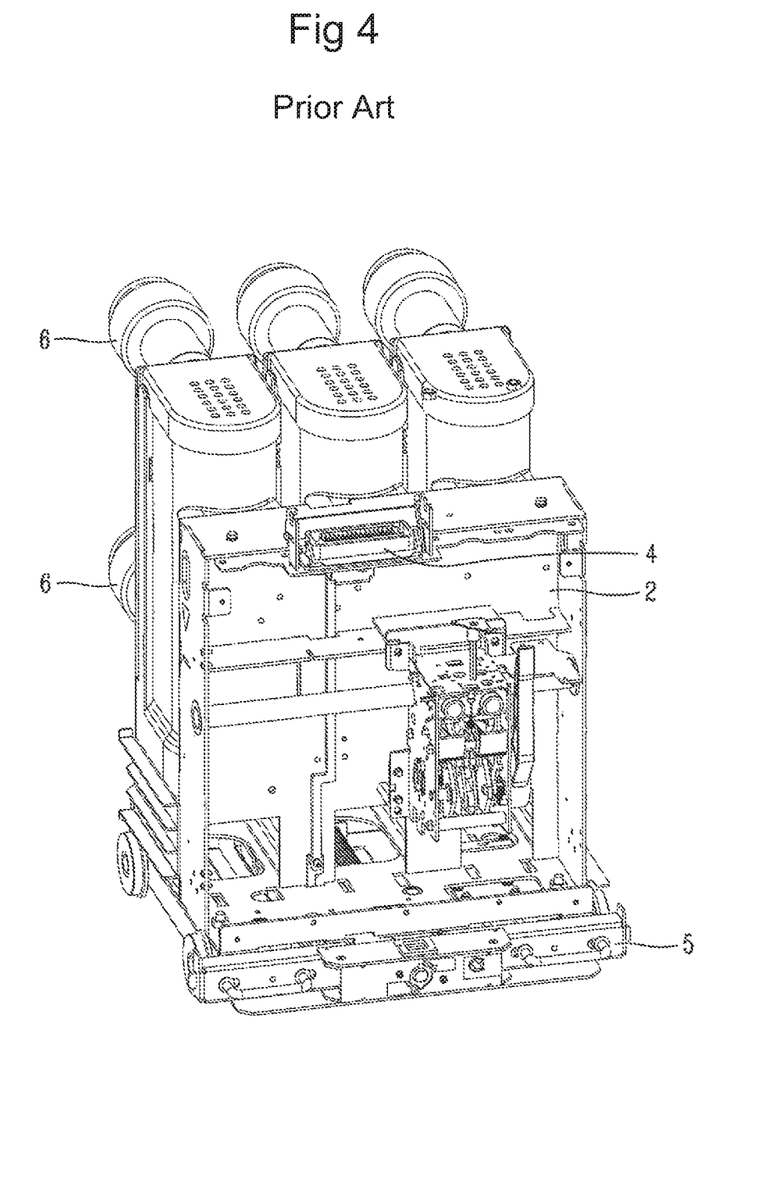
FIG. 4 is a perspective view illustrating the main body, according to a conventional art.
Figure 5:
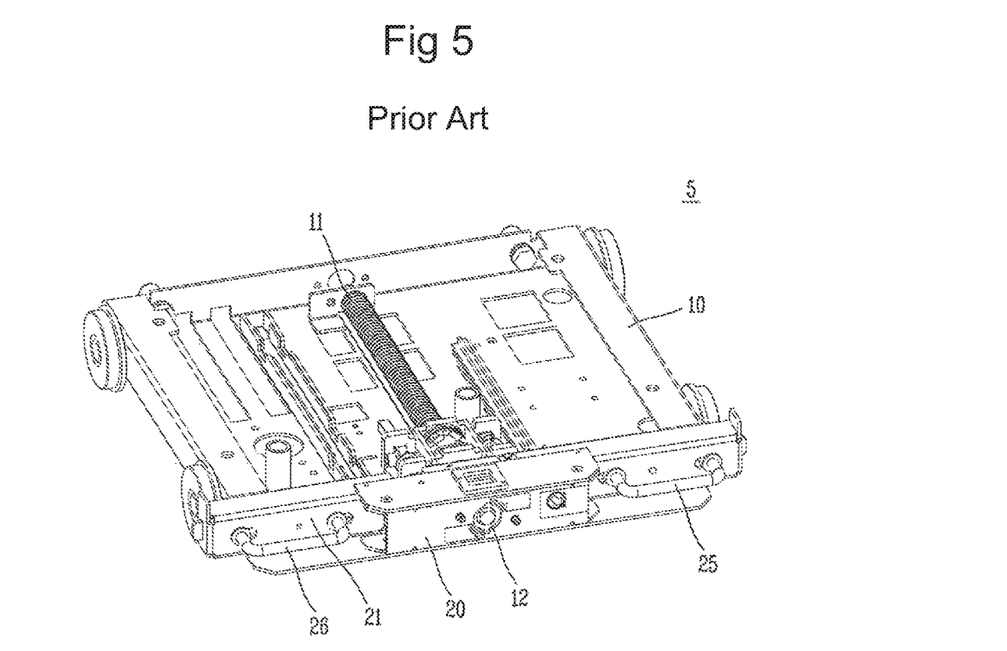
FIG. 5 is a perspective view illustrating the transportation device, according to a conventional art.
Figure 6:
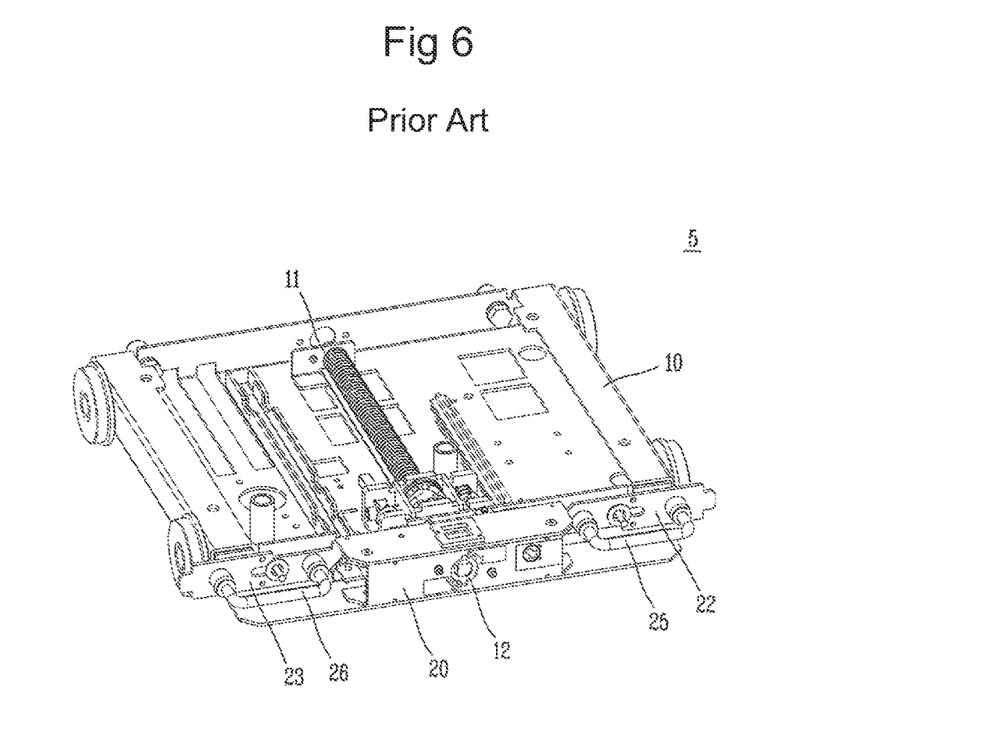
FIG. 6 is a perspective view illustrating that a girder plate is removed in FIG.

FIGS. 4 through 6 are views illustrating a main body and a transportation device of the circuit breaker according to a conventional art, in which FIG. 6 shows a state that a body plate 21 is removed.

The main body 2 is carried and moved by a transportation device 5. That is, a lead screw 11 is rotated by inserting a handle (not shown) into a handle hole 12 of a girder assembly 20 which is connected to a front surface of a truck 10, the truck 10 is moved so that the main body 2 is drawn in or drawn out. In this instance, the girder assembly 20 is fixed to the distribution box 1.

The handle assembly is located at left and right sides of a front portion of the transportation device 5. The handle assembly includes transportation device handles 25 and 26 and left and right sliding plates 22 and 23. The handle assemblies 22, 23; 25 and 26 are structured such that the left and right sliding plates 22 and 23 are coupled to the left and right handles 25 and 26, respectively, in an integrated body so as to be moved in the left and right directions within the girder assembly 20.

Figure 7A:
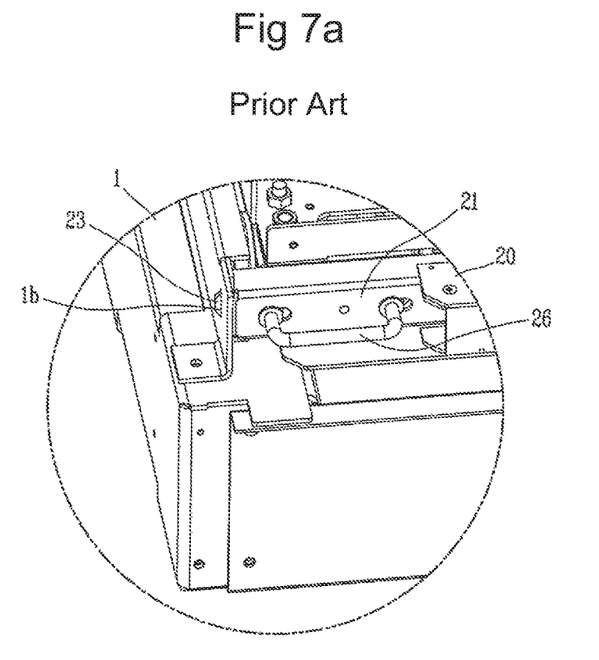
FIGS. 7A and 7B are partial perspective views of FIG. 2, in which a view illustrating a state that a sliding plate is inserted into a rail hole and a state that the sliding plate is escaped from the rail hole by moving a handle, respectively.
Figure 7B:
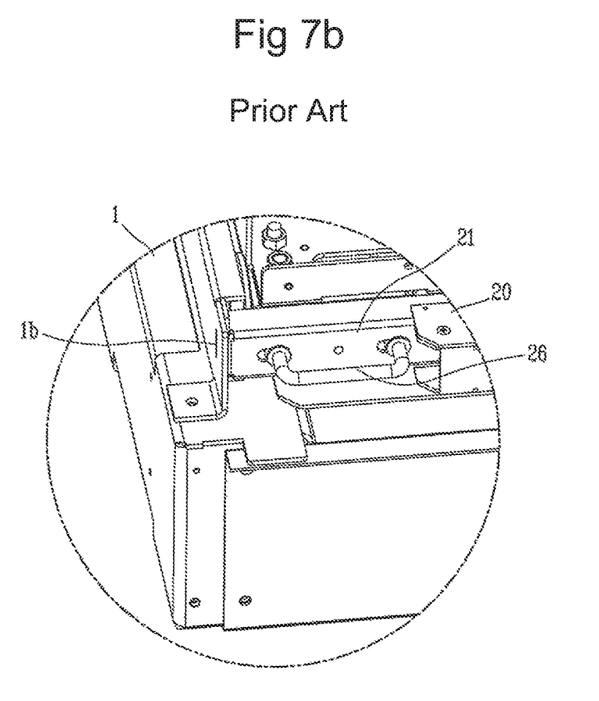

FIGS. 7A and 7B are views illustrating a moving position of the transportation device 5, in which FIG. 7A shows a state that parts of sliding plates 22 and 23 of the transportation device 5 are inserted into a rail hole 1b of the distribution box 1 in a restricted state, and a state that sliding plates 22 and 23 of the transportation device 5 are escaped from the rail hole 1b of the distribution box 1 in a released state, respectively.

In a case where it is intended to separate the main body 2 from the distribution box 1, the handles 25 and 26 of the girder assembly 20 have to be moved inside and the sliding plates 22 and 23 coupled to the handles 25 and 26 have to be escaped from the rail hole 1b.

Figure 8:
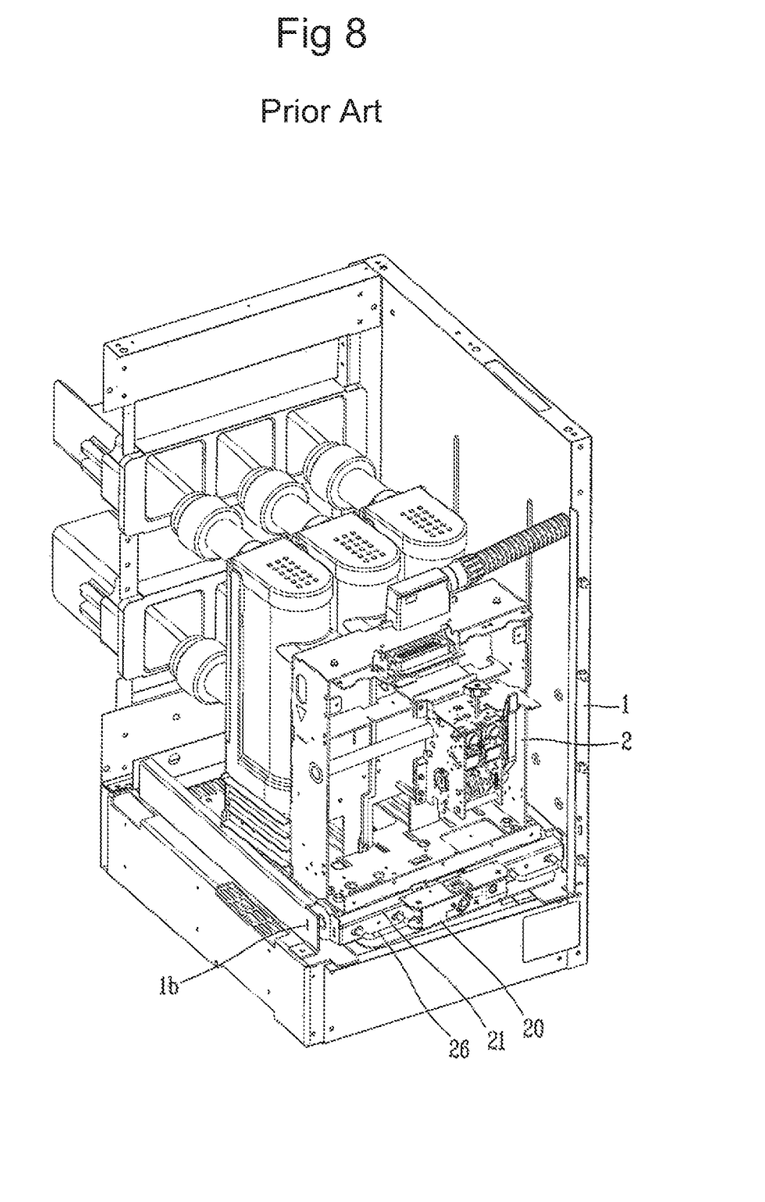
FIG. 8 is a perspective view illustrating that the main body of the withdrawal circuit breaker is abnormally deviated from the distribution box, in which a left sliding plate is escaped from the rail hole.
Figure 9A:
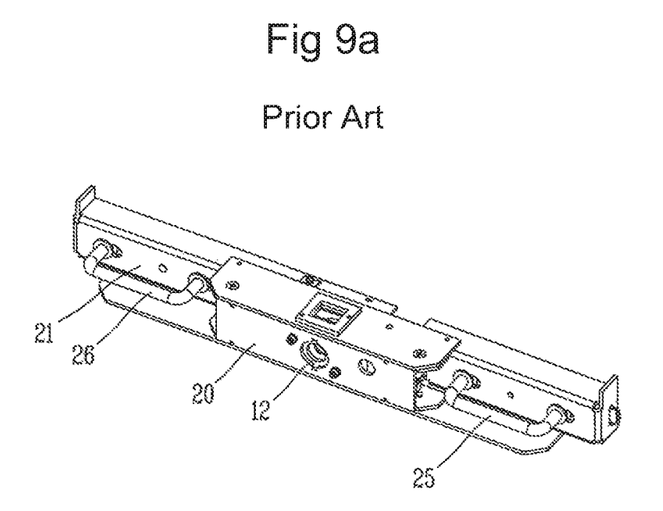
FIGS. 9A and 9B are perspective views illustrating front side and rear side of the girder assembly and handle assembly of FIG. 8.
Figure 9B:
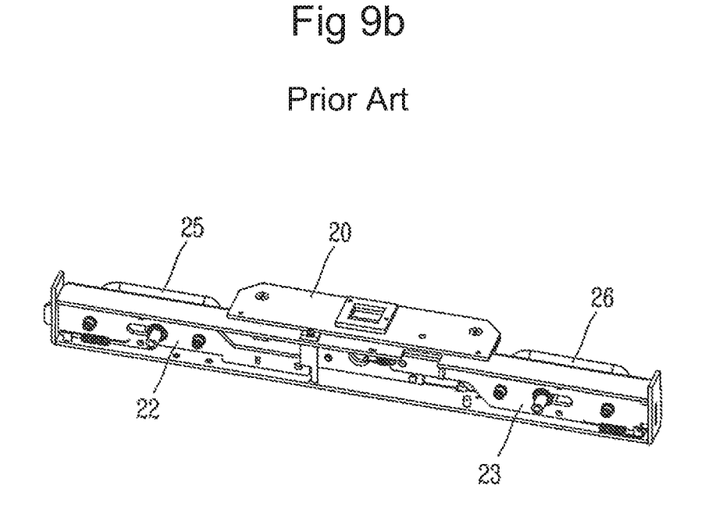

Meanwhile, in a case where only one of the sliding plates 22 or 23 is deviated from the rail hole 1b and another sliding plate is maintained in the sliding hole 1b due to a user's mal-operation, as shown in FIGS. 8 through 9B, the main body 2 can not be drawn out from the distribution box 1, thereby causing damages of parts and a safety accident to a user.

SUMMARY OF THE INVENTION

An object of the present invention is to provide a transportation device of a withdrawal circuit breaker capable of preventing an incomplete separation of a main body of the circuit breaker and securing safety of a user by causing the left and right handle assemblies to be simultaneously operated when drawing the main body out of the circuit breaker.

To achieve these and other advantages and in accordance with the purpose of this specification, as embodied and broadly described herein, there is provided a transportation device of a withdrawal circuit breaker, including a girder assembly mounted on a front surface of a truck and configured to draw-in or draw-out the truck, a body plate formed in a box type having an opened rear side and coupled to the girder assembly, a pair of sliding plates slidably disposed within the body plate, and a rotational plate rotatably disposed between the sliding plates, wherein the transportation device further includes a stopper protruded at one side of the rotational plate and configured to restrict one of the sliding plates, and a connection link having one end rotatably coupled to one end of the rotational plate and another end rotatably coupled to another end of one of the sliding plates.

In one embodiment, the rotational plate includes at its center a center hole in which part of a lead screw mounted on the truck is inserted.

In one embodiment, the pair of sliding plates is coupled to a handle, respectively.

In one embodiment, the rotational plate includes at its sides a pair of arms in the form of protrusion.

In one embodiment, the pair of arms is formed asymmetrically.

In one embodiment, the stopper is formed at a lower part of one of the pair of arms.

In one embodiment, one of the sliding plates includes a spring configured to store a force pulling in a direction of an inner side.

The transportation device of a withdrawal circuit breaker according to one embodiment of the present invention provides an advantage in that an incomplete separation of a main body of the circuit breaker is prevented by causing the left and right handle assemblies to be simultaneously operated when drawing out the main body of the circuit breaker, thereby securing safety of a user.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 12A and 12B are views illustrating a rear side of the girder assembly, in which FIG. 12A shows that the left handle is moved, and FIG. 12B shows that the left and right handles are gathered, in accordance with the present invention.

DETAILED DESCRIPTION OF THE PREFERRED EMBODIMENT

Hereinafter, a preferred embodiment of a transportation device of a withdrawal circuit breaker in accordance with an embodiment of the present invention will now be described in detail with reference to the accompanying drawings.

Referring to FIGS. 10 through 13, the transportation device of a withdrawal circuit breaker in accordance with an embodiment of the present invention includes a girder assembly 20 disposed at a front side of a truck 10 and configured to draw in or draw out the truck 10, a body plate 21 formed in a box type having an opened rear side and coupled to the girder assembly 20, a pair of sliding plates 22 and 23 slidably disposed within the body plate 21, a rotational plate 40 rotatably disposed between the pair of sliding plates 22 and 23 and having at its one side in a protruding manner a stopper 44 configured to restrict one of the sliding plates 22 and 23, and a connection link 45 having one end rotatably coupled to one side of the rotatable plate 40 and another end rotatably coupled to one of the sliding plates 22 and 23.

Figure 10:
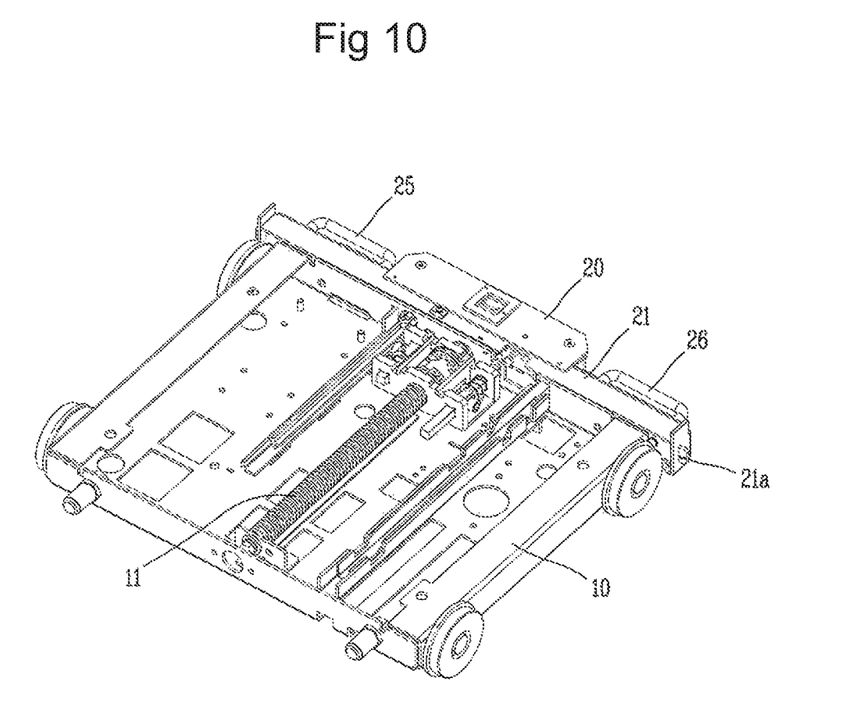
FIG. 10 is a perspective view illustrating a rear side of a transportation device in accordance with the present invention.

Referring to FIG. 10 illustrating a rear side of the transportation device, the transportation device includes a truck (a carrier) 10 configured to carry the main body of the circuit breaker, a girder assembly 20 disposed at a front side of the truck 10 and coupled to a distribution box (refer to a conventional one), and a lead screw 11 having one end exposed through the handle hole 12 of the girder assembly 20 and configured to separate the truck 10 from the girder assembly 20 when a rotational force is applied thereto.

A body plate 21 may be substantially formed in a box type having an opened rear side. At the left and right sides of a front surface of the body plate 21, a pair of handles 25 and 26 are formed in a protrusion manner and at the center of the body plate 21, a lead screw 11 configured to be inserted into the truck 10 is disposed. And at both sides of the body plate 21, through holes 21a through which ends of the pair of sliding plates 22 and 23 may be exposed.

Figure 11:
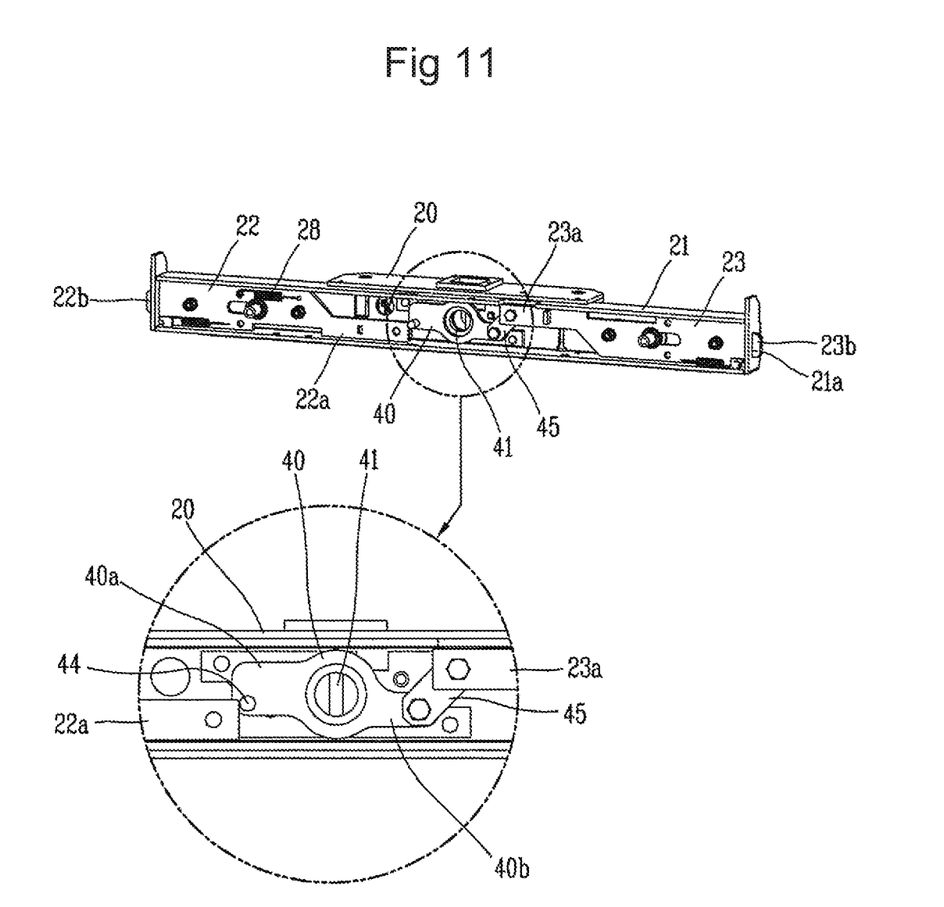
FIG. 11 is a perspective view illustrating a rear side of a girder assembly, in which the handle is widened, in accordance with the present invention.

Referring to FIG. 11, within the body plate 21, the pair of sliding plates 22 and 23 is slidably disposed, in which the right one (in FIG. 11) will be referred to as a first sliding plate 22 and the left one (in FIG. 11) will be referred to as a second sliding plate 23. Each of the sliding plates 22 and 23 includes leg portions 22a and 23a, respectively. The first leg portion 22a of the first sliding plate 22 may be formed at a lower side (on the basis of a horizontal center line of FIG. 11) and the second leg portion 23a of the second sliding plate 23 may be formed at an upper side (on the basis of a horizontal center line of FIG. 11). Here, the horizontal center line is a line which passes along an axial center line of the lead screw 11.

Each of the sliding plate 22 and 23 includes a head portion 22b and 23b at its end, respectively, which may be configured to be inserted into the through hole 21a of the body plate 21 and the rail hole 1b of the distribution box 1, respectively.

The handles 25 and 26 are fixed to the sliding plates 22 and 23. The first handle 25 is fixed to the first sliding plate 22 and the second handle 26 is fixed to the second sliding plate 23, so that the sliding plates 22 and 23 may be moved by moving the handles 25 and 26, respectively.

The rotational plate 40 is formed in a disc type and disposed between the first and second sliding plates 22 and 23. At a center of the rotational plate 40, a center hole 41 through which the lead screw 11 may be inserted is formed. Thus, the rotational plate 40 may be rotated at the center of the lead screw 11.

At both sides of the rotational plate 40, a pair of arms 40*a* and 40*b* are formed in a protrusion manner. The pair of arms 40*a* and 40*b* may be asymmetrically formed. For instance, the first arm 40*a* may be formed to be larger than the second arm 40*b*. Here, the second arm 40*b* may be formed at a lower portion of horizontal center line.

A connection link 45 is disposed between the rotational plate 40 and the second sliding plate 23. One end of the connection link 45 is rotatably coupled to the second arm 40*b* of the rotational plate 40 and another end of the connection link 45 is rotatably coupled to the second leg portion 23*a* of the second sliding plate 23. As a result, the rotational plate 40 may be interworked with movement of the second sliding plate 23.

As shown in FIG. 11, the second leg portion 23*a* of the second sliding plate 23 is located at an upper part of a horizontal center line, and the second arm 40*b* of the rotational plate 40 is located at a lower part of the horizontal center line. When pushing the second sliding plate 23 toward the inside, the connection link 45 moves the rotational plate 40 in the clockwise direction, while rotating in the anticlockwise direction. As a result, the second arm 40*b* moves downward and the first arm 40*a* moves upward.

The stopper 44 is formed on the first arm 40*a* of the rotational plate 40 in a protrusion manner. The stopper 44 may be formed at a lower portion of the first arm 40*a*. The stopper 44 is located at proximity to the first leg portion 22*a* of the first sliding plate 22 in a state that an external force is not applied thereto. Thus, when the first sliding plate 22 is moved inwardly in a state that the second sliding plate 23 is maintained stopped, the first leg portion 22*a* is restricted by the stopper 44, so that the first sliding plate 22 is not enabled to move.

In a case where the second sliding plate 23 is moved inwardly, the rotational plate 40 is moved by the connection link 45 in the clockwise direction and the stopper 44 is escaped from the movement range of the first sliding plate 22. As a result, it is possible to move the first sliding plate 22 inwardly.

The first sliding plate 22 may include a spring 28. The spring 28 may be a compression spring or a tension spring. One end of the spring 28 may be fixed to the first sliding plate 22 and another end thereof may be fixed to the body plate 21 or other fixture elements. The first sliding plate 22 is elastically supported inwardly by the spring 28. When the second sliding plate 23 is moved inwardly, the rotational plate 40 is moved in the clockwise direction, as a result the restriction force of the stopper is released so that the first sliding plate 22 is moved inwardly by the spring 28. That is, since the first sliding plate 22 is interworked with the second slide plate 23, they are moved together without moving independently.

Figure 12A:
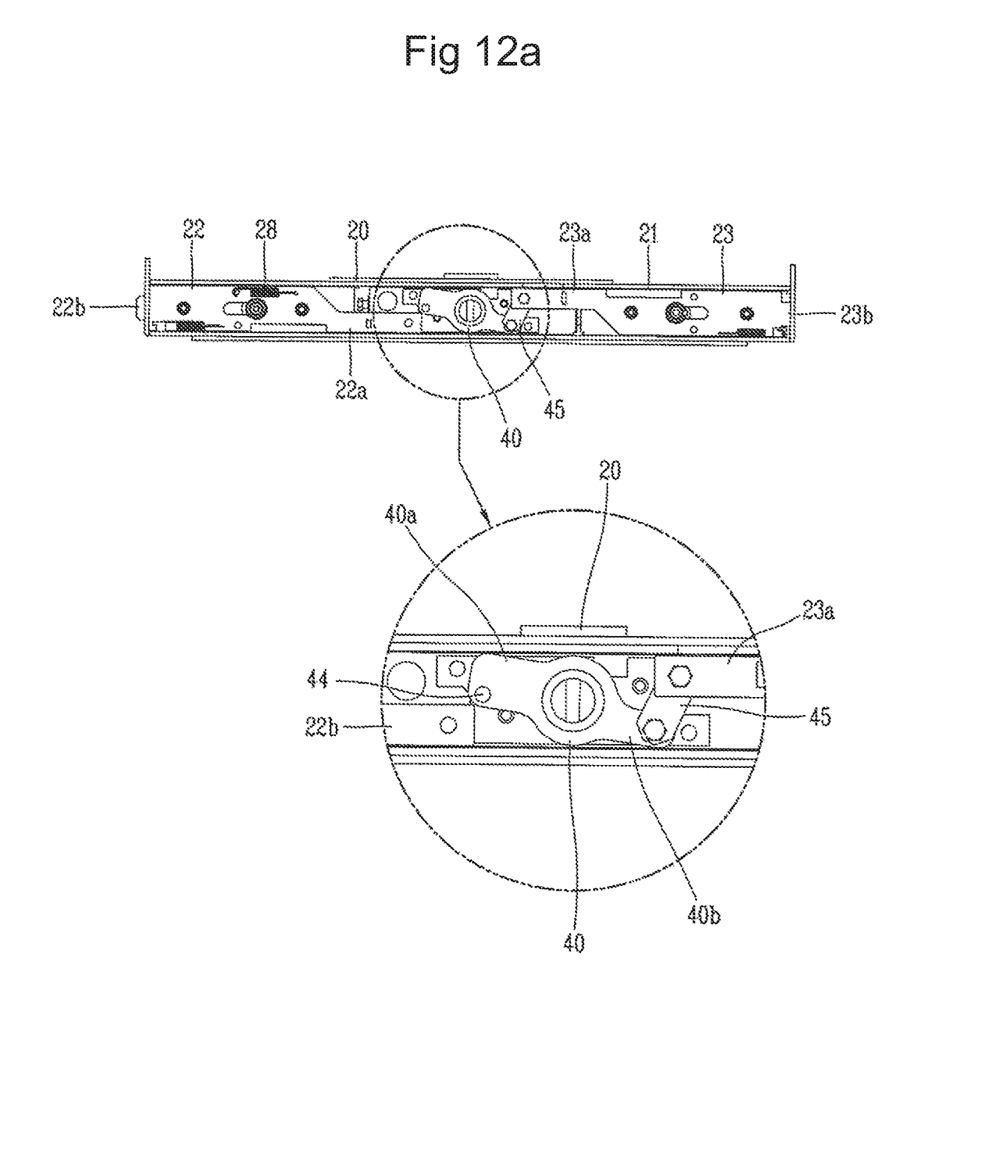
Figure 12B:
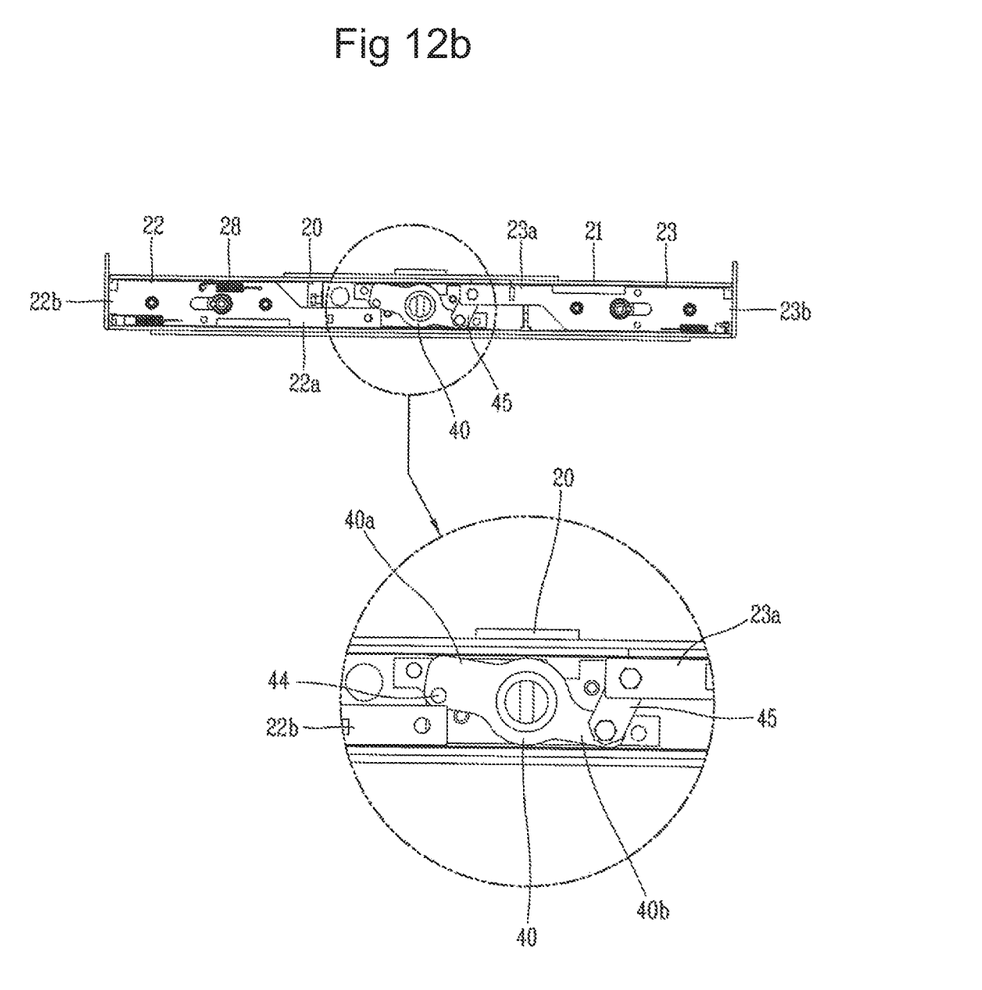

Referring to FIGS. 11 through 12B, the operation of the transportation device of a withdrawal circuit breaker in accordance with one embodiment of the present of the present invention will be described.

When pulling the second sliding plate 23 inwardly, the second head portion 23*b* is escaped from the rail hole 1*b*. As a result, the second leg portion 23*a* urges the connection link 45 to rotate in the anticlockwise direction, while moving inwardly, as shown in FIG. 12A. In this instance, the stopper 44 of the rotational plate 40 is moved upward not to restrict the first sliding plate 22.

When pulling the first sliding plate 22 inwardly, the first head portion 22*b* is escaped from the rail hole 1*b* and the first leg portion 22*b* is moved inwardly while passing through below the stopper 44, as shown in FIG. 12B. Here, when restriction of the stopper 44 is removed, the first sliding plate 22 may be automatically pulled inwardly by the spring 28.

Figure 13:
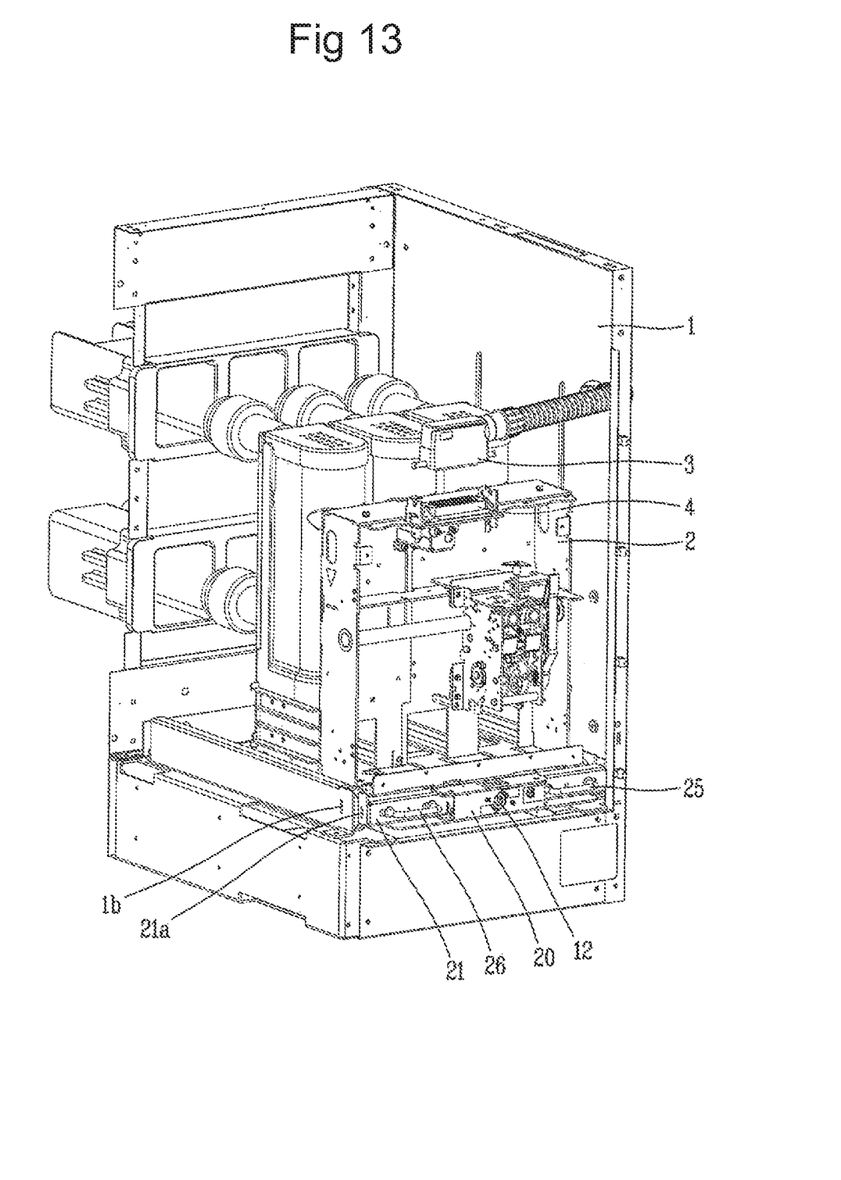
FIG. 13 is a view illustrating that the transportation device in accordance with one embodiment of the present invention is normally drawn out from the cradle.

FIG. 13 shows that the main body 2 is normally separated and drawn out.

On the contrary, when it is intended to push the first and second sliding plates 22 and 23 outwardly, the first sliding plate 22 has to be pulled outwardly and then the second sliding plate 23 has to be pulled outwardly.

In accordance with one embodiment of the present invention, there is provided an effect in that it is possible to prevent the main body of the circuit breaker from being incompletely separated from the distribution box by urging the left and right handle assemblies of the transportation device to be operated together when drawing out the main body, and securing a user safety.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A transportation device of a withdrawal circuit breaker, comprising:
    a girder assembly mounted on a front surface of a truck of the circuit breaker and configured to draw-in or draw-out the truck;
    a body plate formed in a box type having an opened rear side and coupled to the girder assembly;
    a pair of sliding plates slidably disposed within the body plate;
    a rotational plate rotatably disposed between the sliding plates,
    a stopper protruded at one side of the rotational plate and configured to restrict a first one of the sliding plates from sliding inwardly in a first direction; and
    a connection link having one end rotatably coupled to one end of the rotational plate and another end rotatably coupled to another end of a second one of the sliding plates,
    wherein the first one of the sliding plates includes a spring configured to store a force pulling in the first direction, and
    wherein rotation of the rotational plate slides the second one of the sliding plates in a second direction opposing the first direction, and moves the stopper away from the first one of sliding plates allowing the first one of sliding plates to be automatically pulled in the first direction by the spring.

2. The transportation device of claim 1, wherein the rotational plate includes at its center a center hole in which part of a lead screw mounted on the truck is inserted.

3. The transportation device of claim 1, wherein each of the pair of sliding plates are coupled to a handle.

4. The transportation device of claim 1, wherein the rotational plate includes at its sides a pair of arms.

5. The transportation device of claim 4, wherein the pair of arms are formed asymmetrically.

6. The transportation device of claim 5, wherein the stopper is formed at a lower part of one of the pair of arms of the rotational plate.

\* \* \* \* \*